(12) United States Patent
Hering et al.

(10) Patent No.: US 8,917,200 B2
(45) Date of Patent: Dec. 23, 2014

(54) AIRCRAFT WEATHER RADAR WITH REDUCED HEADING, ATTITUDE AND RANGE ARTIFACTS

(75) Inventors: Jeffrey Hering, Oak Creek, WI (US); Ronald Elliot Zelazo, Franklin Lakes, NJ (US)

(73) Assignee: Astronautics Corporation of America, Milwaukee, WI (US)

(*) Notice: Subject to any disclaimer, the term of this patent is extended or adjusted under 35 U.S.C. 154(b) by 718 days.

(21) Appl. No.: 13/176,494

(22) Filed: Jul. 5, 2011

(65) Prior Publication Data
US 2013/0009808 A1   Jan. 10, 2013

(51) Int. Cl.
*G01S 13/00* (2006.01)
*G01S 7/24* (2006.01)
*G01S 13/95* (2006.01)
*G01S 7/22* (2006.01)
*G01S 7/00* (2006.01)

(52) U.S. Cl.
CPC ............... *G01S 7/24* (2013.01); *G01S 13/953* (2013.01); *G01S 7/22* (2013.01); *G01S 7/003* (2013.01)

USPC .................................................. 342/26 B

(58) Field of Classification Search
CPC ......... G01S 19/953; G01S 7/22; G01S 7/003; G01S 13/953; G01S 7/24
USPC .................................................. 342/26 B
See application file for complete search history.

(56) References Cited

U.S. PATENT DOCUMENTS

| | | | |
|---|---|---|---|
| 5,053,773 A | | 10/1991 | Mosinski |
| 5,907,568 A | * | 5/1999 | Reitan, Jr. .................... 342/26 B |
| 6,879,280 B1 | * | 4/2005 | Bull et al. .................... 342/26 B |
| 6,977,608 B1 | * | 12/2005 | Anderson et al. ........... 342/26 B |
| 7,098,809 B2 | * | 8/2006 | Feyereisen et al. ........... 340/963 |
| 7,132,974 B1 | * | 11/2006 | Christianson ................ 342/26 R |
| 7,337,043 B2 | * | 2/2008 | Bull .................................. 701/1 |
| 7,528,765 B1 | | 5/2009 | Woodell et al. |
| 7,728,758 B2 | | 6/2010 | Varadarajan et al. |
| 2010/0302093 A1 | * | 12/2010 | Bunch et al. ................. 342/26 B |

* cited by examiner

*Primary Examiner* — Frank J McGue
(74) *Attorney, Agent, or Firm* — Boyle Fredrickson, S.C.

(57) ABSTRACT

An avionic weather radar system tracks aircraft orientation with respect to acquired scan radar data to correct the display of the weather radar data for range distortion and orientation changes of the aircraft between radar acquisition and display, reducing image artifacts.

19 Claims, 3 Drawing Sheets

AIRCRAFT WEATHER RADAR WITH REDUCED HEADING, ATTITUDE AND RANGE ARTIFACTS

STATEMENT REGARDING FEDERALLY SPONSORED RESEARCH OR DEVELOPMENT

-

CROSS REFERENCE TO RELATED APPLICATION

-

BACKGROUND OF THE INVENTION

The present invention relates to aircraft electronics and in particular to aircraft weather radar systems.

Weather radar uses echo returns from transmitted radio signals (typically in the megahertz and gigahertz spectrum) to locate and characterize precipitation and its motion. Precipitation may be characterized by the intensity of the echo return and motion characterized by Doppler principles in which moving particles provide a frequency shift to the echo return.

Aircraft weather radar uses these principles to provide guidance to pilots with respect to storm cells and the like. In such systems, a radar antenna may be fixed to the nose or wing of the aircraft and scanned either mechanically or using phased array techniques. Typically the radar beam is collimated to a focused ray which is scanned in a horizontal plane directed outward along the flight path of the aircraft to provide information about weather in the path of the aircraft, while reducing reflections from the ground (ground clutter). The angle of the radar beam with respect to the horizon may be adjusted, however, so that the pilot may direct the radar to regions of interest not necessarily at the current altitude of the aircraft.

The weather data derived from the echo returns may be displayed in real-time on a display in the cockpit. The image on the display is normally displayed in 2 dimensions and oriented with respect to a small fixed aircraft icon so that weather systems directly in front of the aircraft are positioned directly above the icon while those to the left and right of the aircraft are depicted to the left and right of the icon respectively. This approach provides the pilot a constant indication of weather patterns in front of the aircraft flight path.

While mechanisms for moving radar antenna or adjusting the angle of a phased array can theoretically scan the field of view of the radar at high speed, as a practical matter the need to wait for echo returns and sufficient data sampling, limit the scan rate of the antenna to on the order of seven seconds per scan acquisition.

Unlike a ground-based radar, the antenna used in aircraft weather radar is mounted to a moving object (e.g. the aircraft) which can be subject to constant changes in orientation particularly if there is buffeting in storm regions. It is known that some weather radar systems stabilize the angle of the scanning plane of the radar using a vertical gyroscope on the aircraft.

SUMMARY OF THE INVENTION

The present inventors have recognized that the relatively slow scan rate of weather radar combined with the relative mobility of the aircraft can create significant artifacts in the display of weather data when the heading of the aircraft has changed significantly between the acquisition of the data and its display. Specifically, weather radar systems may fail to accurately display the bearing to large weather cells for many seconds during the banking of the aircraft, after which the weather cell will appear to jump abruptly on the display. The range (distance) to weather patterns and their shape is also subject to artifacts caused by changing pitch of the aircraft. Such artifacts may be misleading to the pilot and may complicate efforts to moderate fuel consumption when steering around a storm cell which may seem to jump, vary in distance or change in shape as the plane banks or changes pitch.

The present invention addresses this problem by correcting displayed weather data according to the changing heading and pitch of the aircraft. In this way, although the weather pattern will shift dimensionally in minor aspects between each scan, based on evolution of the weather system, the general bearing and shape of the weather pattern with respect to the aircraft will be largely accurate and free from sudden jumps or artifacts.

In one embodiment, the invention provides an electronic display processor for an avionic weather radar system having inputs for receiving electronic aircraft data providing aircraft heading and pitch, and for receiving radar scan data providing for echo information at a plurality of scan angles and ranges. The electronic display processor may output a graphical representation of at least a portion of the radar scan data mapped to a display angle and display range and may include an electronic computer communicating with input and output devices and executing a stored program to correct a display angle of echo information in the graphical representation according to any change in heading of the aircraft between an acquisition of the radar scan data and the outputting of the graphical representation.

It is thus an object of at least one embodiment of the invention to provide a display of weather data that better assists the pilot in making real time decisions about course adjustments with respect to weather conditions.

The graphical representation may be oriented with respect to an axis of the aircraft and the correction of display angle of the echo information in the output graphical representation may change a display angle of the echo information from a scan angle of the echo information by the difference between a heading of the aircraft at the time of acquisition of the radar scan data and a heading of the aircraft at the time of the display of the radar scan data.

It is thus an object of at least one embodiment of the invention to provide a simple correction system that minimizes heading artifacts.

The electronic aircraft data may further provide aircraft pitch and the electronic computer may execute the stored program to correct a display range of the echo information in the graphical representation according to a pitch of the aircraft at a time of acquisition of the radar scan data.

It is thus an object of at least one embodiment of the invention to ensure proper display of range data despite changes in the pitch of the aircraft, particularly when aircraft pitch may be changing abruptly.

The aircraft data may further provide for radar angle indicating an elevation angle (tilt) of the radar scan data with respect to an axis of the aircraft and the electronic computer may further execute the stored program to correct a display range of the echo information in the graphical representation according to the radar tilt angle at the time of acquisition of the radar scan data independent of the current tilt angle and aircraft pitch.

It is thus an object of at least one embodiment of the invention to accommodate changes in radar tilt angle independently of changes in aircraft pitch.

The correction may change the display range of the echo information according to a cosine of the sum of the radar tilt angle and aircraft pitch at the time of acquisition. This correction, when applied, will alter the displayed shape of weather patterns to more accurately represent their actual shape in relation to ground-based landmarks.

It is thus an object of at least one embodiment of the invention to provide a consistent reference of weather range according to ground distances independent of aircraft pitch or radar beam tilt angle.

The radar scan data for each scan angle may be linked to aircraft heading information.

It is thus an object of at least one embodiment of the invention to record conditions of radar acquisition for correction on as little as a single radar scan line.

The electronic computer may output repeated graphical representation of the portion of the echo information at a first frequency higher than a second frequency at which radar scan data for the echo information at the plurality of scan angles is obtained.

It is thus an object of at least one embodiment of the invention to provide artifact-reduced data to the pilot on a timescale substantially shorter than the scan time of the radar.

The graphical representation may be formed of rectilinear rows and columns of pixels and the correction may interpolate between one or more echo information samples and/or one or more pixels.

It is thus an object of at least one embodiment of the invention to provide for reduced image artifacts in the mapping between one or both of range and angle corrected data.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION OF THE PREFERRED EMBODIMENT

Figure 1:
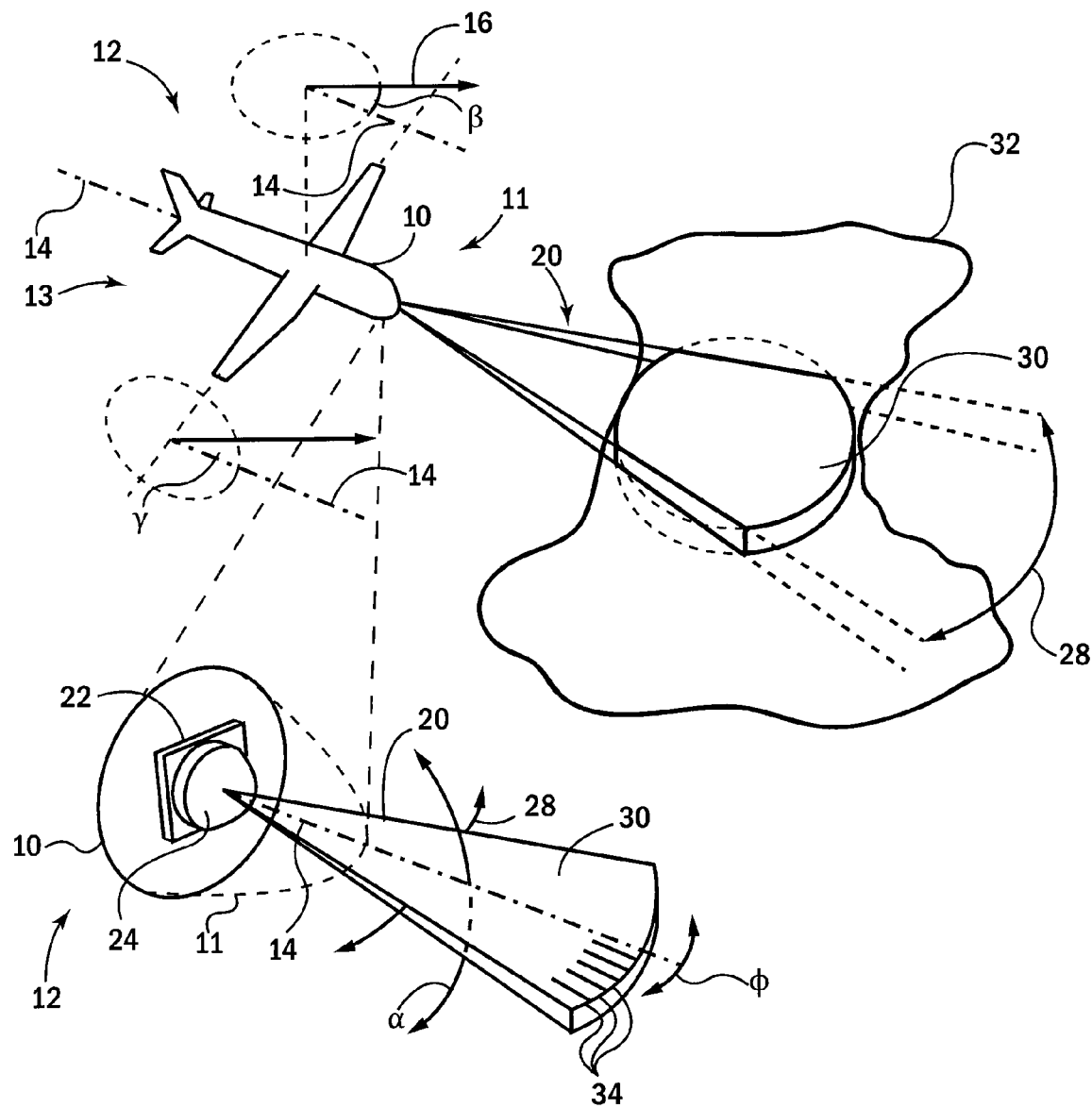
FIG. 1 is a perspective diagram showing heading angle and pitch angle of an aircraft and array angle and scan angle of the weather radar affixed to the aircraft such as will be referred to in the discussion of the present invention.

Referring now to FIG. 1, an airframe 10 of an aircraft 12 extends along an axis 14 directed between the nose 11 and tail 13 of the aircraft 12. The orientation of the axis 14 with respect to a fixed reference direction 16 (for example geographic North) in a generally horizontal plane will be termed herein "heading angle" $\beta$ whereas the orientation of the axis 14 with respect to the horizon 18 in a vertical plane will be termed herein "pitch angle" $\gamma$.

The nose 11 of the aircraft 12 may house a weather radar transceiver 22 having an antenna 24 directing a radar beam 20 forward and generally along the axis 14 in the direction of the flight path of the aircraft 12. The radar beam 20 will generally subtend an acquisition angle 28 within a horizontal plane 30 to provide an image of a horizontal section of a weather system 32. Generally, the radar beam 20 will take echo measurements along a set of radar rays (radials) 34 within the horizontal plane 30 at different radar scan angles $\phi$ with respect to axis 14, either by mechanical scanning of the antenna 24 or by phase array techniques. The angle of the horizontal plane 30 with respect to the axis 14 of the airframe 10 may be adjusted in elevation by a radar tilt angle $\alpha$ to be directed generally upward or downward with respect to the axis 14.

Figure 2:
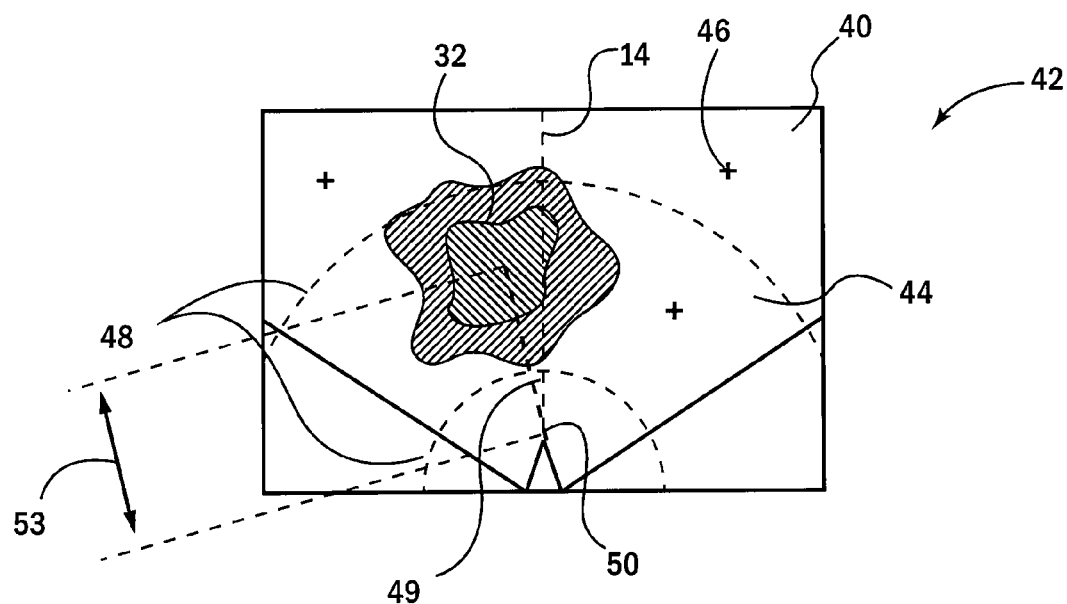
FIG. 2 is a front elevational view of a weather radar display such as may be generated from data collected by the radar of FIG. 1 showing a weather cell with respect to the current orientation of the aircraft.

Referring now to FIG. 2, a radar image 40 may be displayed on a graphics display 42 in the cockpit of the aircraft providing a mapping of the echo signals obtained along each of the radar radials 34 mapped to image pixels within a sector 44 defined by acquisition angle 28 of the radar beam to provide a top plan view of a cross-section of the weather system 32. The graphics display 42 depicting radar image 40 may also provide navigational aid markers 46 providing a context for the location of the weather system 32 as well as range markers 48 providing a distance (e.g. 20 and 40 nautical miles) from an aircraft icon 50. The aircraft icon 50 is typically fixed in orientation with respect to the radar image 40 such that the axis 14 of the aircraft icon 50 extends vertically bisecting the radar image 40. In this way, weather systems 32 to the starboard of the aircraft 12 will be displayed on the right side of the radar image 40 and weather systems 32 to the port of the aircraft 12 will be displayed on the left side of the radar image 40.

The display 42 may be a conventional CRT or LCD display and may provide a refresh rate on the order of 60 frames per second during which refresh new calculated radar image 40 data may be received. The display 42 may provide for color renditions of the weather system 32, for example, indicating precipitation velocities through the use of Doppler techniques of type well known in the art. Generally, each element of the weather cell 32 in the radar image 40 will have a display angle 49 and display range 53 with respect to the aircraft icon 50 mirroring an angle and distance between the actual weather cell 32 and the aircraft 12. As noted, typically the aircraft icon 50 has a fixed orientation however the invention also contemplates systems allowing movement of the aircraft icon 50 in addition to or instead of movement of the weather cells 32 upon a change in heading and/or range.

Figure 3:
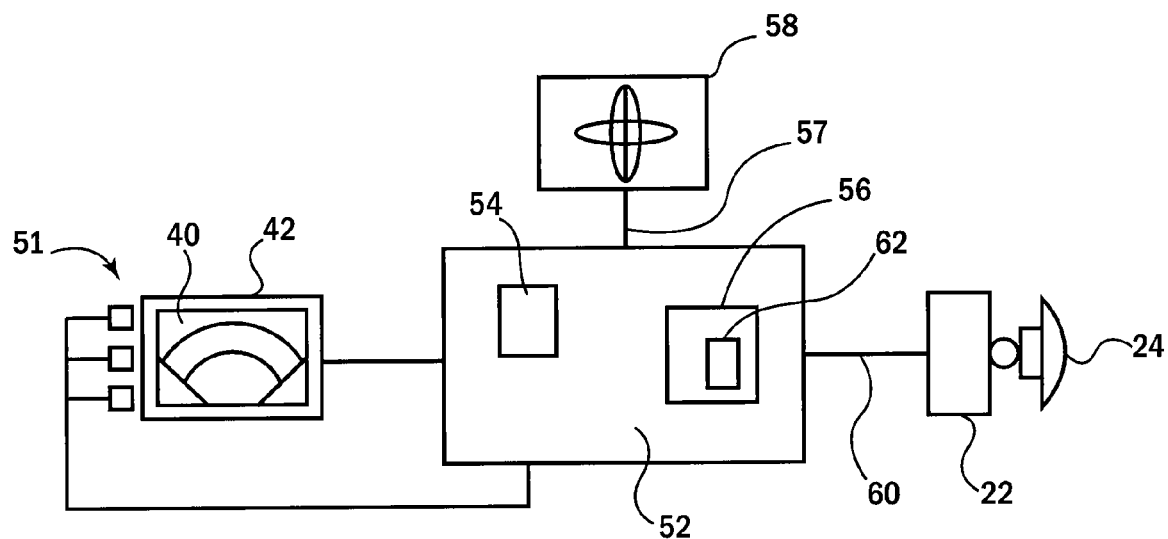
FIG. 3 is a functional block diagram of the present invention showing a radar system, navigational avionics, and an electronic computer for processing the same according to a stored program to be described herein for display of the data on a display screen.

Referring now to FIG. 3, the display 42 and display control buttons 51 may communicate with electronic display processor unit 52 providing, for example, an internal processor for executing a stored program 62, as will be described and as is stored in memory 56. The display processor unit 52 may receive navigational data 57 from navigational avionics 58, for example, heading and pitch information obtained through devices well known in the art, for example, compasses, gyroscopes, and GPS receivers. The display processor unit 52 may also receive radar signals 60 providing echo data as well as radar ray angle $\phi$ and radar elevation angle $\alpha$ described above.

Figure 4:
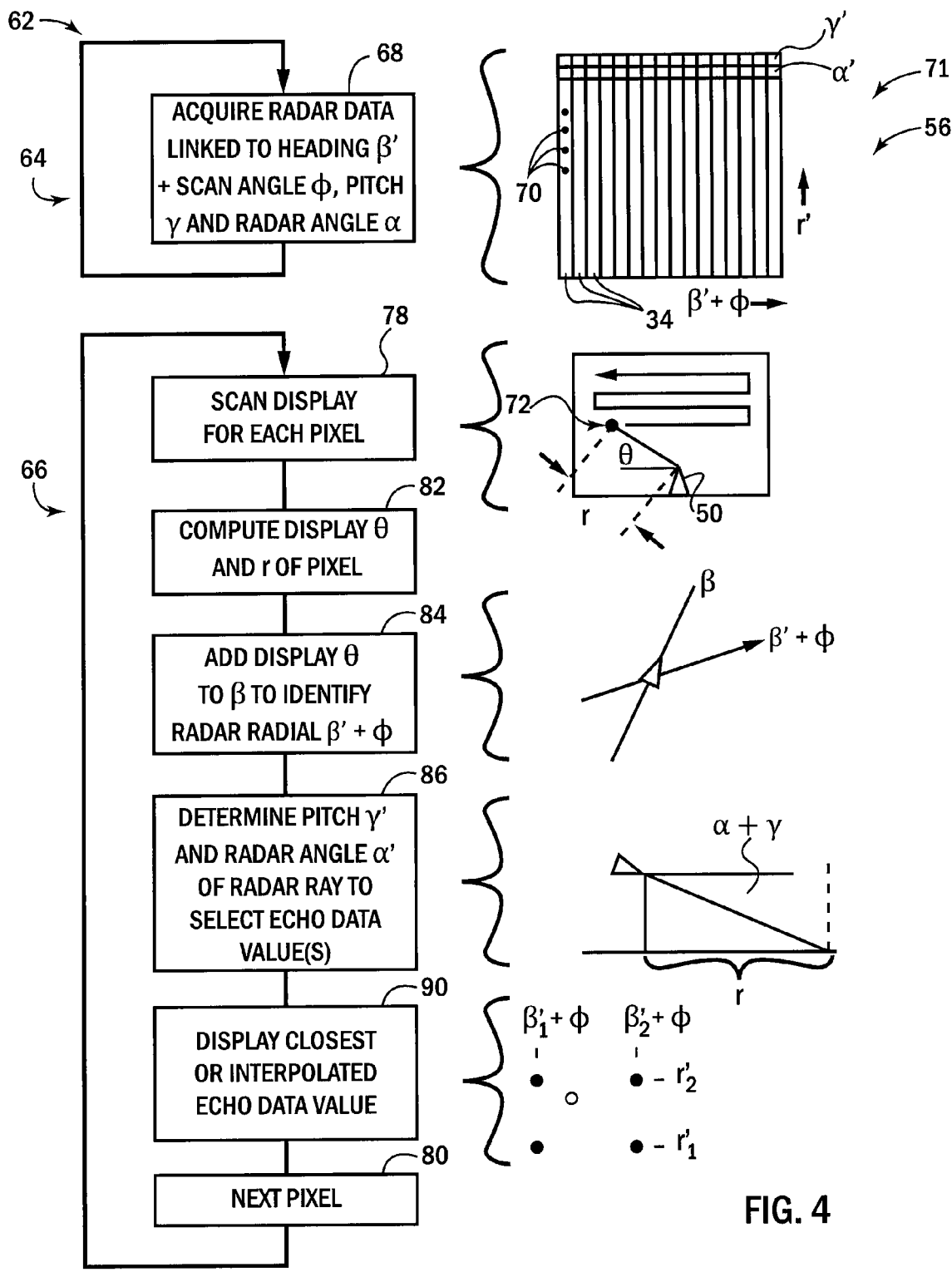
FIG. 4 is a flowchart of the stored program with accompanying diagrams of data structures and calculations implemented by the present invention in correcting for heading and range related weather radar artifacts.

Referring now to FIG. 4, the program 62 executed by the display processor unit 52, may contemporaneously execute a first and second threads 64 and 66. The first thread 64, as indicated, by process block 68 acquires echo data values 70 organized by the sum of current heading β' and the radar scan angle φ, depicted as data columns 34 and stored in memory 56. Multiple columns 34 collectively provide echo data value 70 for the entire acquisition angle 28 within the horizontal plane 30.

The echo data values 70 comprise raw echo data received from the weather radar transceiver (shown in FIG. 3) processed and sampled by techniques known in the art including frequency filtration and the like to provide quantitative range delineated values indicating the characteristic of the atmosphere at particular ranges from the aircraft 12 along the corresponding radar scan angle φ.

Each of the echo data values 70 in a column 34 may be linked to a column-specific value of the aircraft pitch γ', and the antenna array tilt angle α' at the time of acquisition. Each echo data value 70 may also be linked to a calculated range value r' being generally a function of the propagation speed of the radio waves in the atmosphere and time. These orientation and range variables at the time of acquisition are distinguished from current values of the same variables by the addition of the prime mark.

This linking of the echo data value 70 to orientation and range variables at the time of acquisition may be done in a variety of fashions including a table structure as shown or using a linked list or database or other data structures known in the art.

The thread 64 executes repeatedly, typically on a period of about once every seven seconds, the time required to obtain a full scan of radar data 71 over the acquisition angle 28.

Referring still to FIG. 4, the second thread 66 repeatedly loops to perform a display of the data stored in memory 56 on the display 42. At first process block 78, the thread 66 initiates a loop in which each pixel 72 of the display is updated in a scan defined by a loop consisting of process block 78 and process block 80. Within this loop at process block 82, for each given pixel 72, a display angle θ and display range r of the pixel with respect to the aircraft icon 50 is determined providing essentially a polar coordinate value for the pixel 72.

At process block 84, the screen coordinates of the pixel 72 are mapped to an echo data value 70 of the radar scan data by adding to the display angle θ to the current heading β and using this sum to directly access the appropriate column 34 which represents the sum of the acquisition heading β' and the acquisition angle φ. In this way, stale radar information (possibly as much as 7 seconds old) will be correctly positioned on the display 42.

At next process block 86, correct echo data values 70 within the radar radials 34 will be identified by determining the aircraft pitch γ' and the radar angle α' associated with the column 34 to correct for the foreshortening effect on displayed ground distance when the radar is not horizontal to the ground. In particular, the display range value r will be divided by the cosine of the sum of α' and γ' to determine the appropriate range value r' to be applied to the particular column 34 to identify the appropriate echo data value(s) 70 closest to the pixel 72.

At succeeding process block 90 an optional interpolation step may be provided allowing for interpolation between values of β' and r' with respect to the mapping of pixel 72 into the radar data 71. In one embodiment, a two-dimensional interpolation or four point interpolation may be used according to techniques well known in the art wherein the interpolated value is a function of distance to each of the surrounding points.

At process block 80 the computer pixel value may be output to the screen and next pixel scanned and processed as described above.

It will be appreciated that this described process of program 62 serves to correct the displayed bearing of the radar data according to a difference between the heading of the aircraft at the time the data was acquired and the heading at the time the data is displayed. In addition range data is corrected according to the angle of the radar beam 20 at the time of its acquisition.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electronic display processor for an avionic weather radar system comprising:
   at least one input for receiving electronic aircraft data providing aircraft heading, and for receiving radar scan data providing for echo information at a plurality of scan angles and ranges;
   at least one output for outputting a graphical representation of at least a onion of the radar scan data mapped to a display angle and display range; and an electronic computer communicating with the input and output devices and executing a stored program held in non transient media to correct the display angles of echo information in the graphical representation for given radar scan data to differ from the scan angles of the given radar scan data, the correction befit according to a change in a heading of the aircraft between a time of acquisition of the given radar scan data and a time of outputting of the graphical representation of the given radar scan data.

2. The electronic display processor of claim 1 wherein the graphical representation is oriented with respect to an axis of the aircraft and wherein the correction of display angle of the echo information in the output graphical representation changes a display angle of the echo information from a scan angle of the echo information by a difference between a heading of the aircraft at the time of acquisition of the radar scan data and a heading of the aircraft at the time of the outputting of the graphical representation.

3. The electronic display processor of claim 1 wherein the electronic aircraft data further provides aircraft pitch and wherein the electronic computer further executes the stored program to correct a display range of the echo information in the graphical representation according to a pitch of the aircraft at the time of acquisition of the radar scan data.

4. The electronic display processor of claim 1 wherein the aircraft attitude data further provides for radar tilt angle indicating an elevational angle of the radar scan data with respect to an axis extending between a nose and tail of the aircraft and wherein the electronic computer further executes the stored program to correct a display range of the echo information in the graphical representation according to the radar tilt angle at the time of acquisition of the radar scan data independent of the current radar tilt angle.

5. The electronic display processor of claim 4 wherein the electronic computer executes the stored program to correct the display range of the echo information in the graphical representation according to a sum of the radar tilt angle and aircraft pitch at a time of acquisition of the radar scan data.

6. The electronic display processor of claim 5 wherein the correction changes the display range of the echo data according to a cosine of the sum of the radar tilt angle and aircraft pitch with respect to the horizon.

7. The electronic display processor of claim 1 wherein the radar scan data for each scan angle is linked to aircraft heading information.

8. The electronic display processor of claim 1 wherein the electronic computer outputs repeated graphical representation of the portion of the echo range information at a first frequency higher than a second frequency at which radar scan data for the echo range information at the plurality of scan angles is obtained.

9. The electronic display processor of claim 1 wherein the graphical representation is formed of rectilinear rows and columns of pixels and wherein the correction includes interpolation between at least one or more echo information samples and one or more pixels.

10. An aircraft comprising:
an airframe;
a weather radar attached to the airframe to provide radar scan data providing for echo information at a plurality of scan angles and ranges with respect to the airframe;
aircraft instrumentation attached to the airframe providing electronic aircraft data providing aircraft heading;
a graphic display viewable by a pilot of the aircraft;
an electronic display processor receiving given radar scan data from the weather radar and data from the instrumentation and executing a stored program held in non transient media to correct display angles of echo information in a graphical representation output to the graphic display for given radar scan data to differ from the scan angles of the given radar scan data the correction of display angle being a function of change in heading of the aircraft between an acquisition of the given radar scan data and the display of the given radar scan data.

11. A method of correcting a display of avionic weather radar information comprising the steps of:
(a) receiving electronic aircraft data providing aircraft heading;
(b) receiving radar scan data providing for echo information at a plurality of scan angles and ranges;
(c) correcting display angles of echo information from given radar scan data in a given graphical representation according to a change in a heading of the aircraft between a time of acquisition of the given radar scan data and a time of outputting of the given graphical representation of the given radar scan data, the correcting changing the scan angles of the given scan data by the change in heading to produce corresponding display angles; and
(d) outputting the graphical representation to a display screen.

12. The method of claim 11 wherein the graphical representation is oriented with respect to an axis of the aircraft and wherein the correction of display angle of the echo information in the output graphical representation changes a display angle of the echo information from a scan angle of the echo information by a difference between a heading of the aircraft at the time of acquisition of the radar scan data and a heading of the aircraft at the time of outputting of the graphical representation.

13. The method of claim 11 further including the step of correcting a display range of the echo information in the graphical representation according to a pitch of the aircraft at the time of acquisition of the radar scan data.

14. The method of claim 11 further including the step of correcting a display range of the echo information in the graphical representation according to a radar tilt angle at the time of acquisition of the radar scan data, the radar tilt angle indicating an elevational angle of the radar scan data with respect to an axis extending between a nose and tail of the aircraft.

15. The method of claim 14 wherein the correction of the display range of the echo information in the graphical representation is according to a sum of the radar tilt angle and aircraft pitch at a time of acquisition of the radar scan data.

16. The method of claim 15 wherein the correction changes the display range of the echo data according to a cosine of the sum of the radar tilt angle and aircraft pitch with respect to horizontal.

17. The method of claim 11 including the step of linking the echo information to aircraft heading information.

18. The method of claim 11 including the step of repeating an output of graphical representations to the display at a first frequency higher than a second frequency at which radar scan data for the echo range information at the plurality of scan angles is received.

19. The method of claim 11 wherein the graphical representation is formed of rectilinear rows and columns of pixels and including the step of interpolating between one or more echo information samples and one or more pixels.

* * * * *

UNITED STATES PATENT AND TRADEMARK OFFICE
CERTIFICATE OF CORRECTION

PATENT NO. : 8,917,200 B2
APPLICATION NO. : 13/176494
DATED : December 23, 2014
INVENTOR(S) : Jeffrey Hering et al.

It is certified that error appears in the above-identified patent and that said Letters Patent is hereby corrected as shown below:

IN THE CLAIMS

CLAIM 1, Col. 6, Line 66, delete "of at least a onion" and substitute therefore

-- of at least a portion --

CLAIM 1, Col. 7, Line 6, delete "the correction befit according" and substitute therefore -- the correction being according --

Signed and Sealed this
Seventh Day of April, 2015

Michelle K. Lee
*Director of the United States Patent and Trademark Office*